United States Patent

Neumann

Patent Number: 5,609,130
Date of Patent: Mar. 11, 1997

[54] NON-RETURN VALVE

[75] Inventor: Barry R. Neumann, Hillarys WA, Australia

[73] Assignee: Transcom Gas Technologies Pty Ltd., Herdsman, Australia

[21] Appl. No.: 481,416

[22] PCT Filed: Dec. 14, 1993

[86] PCT No.: PCT/AU93/00651
§ 371 Date: Nov. 14, 1995
§ 102(e) Date: Nov. 14, 1995

[87] PCT Pub. No.: WO94/13986
PCT Pub. Date: Jun. 23, 1994

[30] Foreign Application Priority Data

Dec. 14, 1992 [AU] Australia .................. PL 6347

[51] Int. Cl.6 .......................... F02B 19/02; F02M 21/02; F16K 15/04
[52] U.S. Cl. .................. 123/267; 137/515.5; 137/533.11
[58] Field of Search .................. 123/256, 259, 123/266, 267, 274, 275, 293; 137/515, 515.5, 533.11

[56] References Cited

U.S. PATENT DOCUMENTS

| | | | |
|---|---|---|---|
| 3,905,343 | 9/1975 | Ryan | 123/267 |
| 3,908,625 | 9/1975 | Romy | 123/267 |
| 3,926,169 | 12/1975 | Leshner et al. | 123/267 |
| 4,006,725 | 2/1977 | Baczek et al. | 123/267 |
| 4,096,832 | 6/1978 | Casull et al. | 123/267 |
| 4,319,552 | 3/1982 | Sauer et al. | 123/267 |
| 4,338,897 | 7/1982 | Drumheller et al. | 123/267 |
| 4,524,744 | 6/1985 | Adams | 123/267 |
| 4,736,718 | 4/1988 | Linder | 123/267 |
| 4,892,070 | 1/1990 | Kuhnert | 123/274 |
| 5,024,193 | 6/1991 | Graze, Jr. | 123/259 |
| 5,046,526 | 9/1991 | Longmore et al. | 137/515.5 |
| 5,081,969 | 1/1992 | Long, III | 123/274 |
| 5,086,613 | 2/1992 | Fox et al. | 56/10.9 |
| 5,222,993 | 6/1993 | Crane | 123/256 |

FOREIGN PATENT DOCUMENTS 1074081 10/1954 France.
WO91/12418 8/1991 WIPO.

Primary Examiner—Willis R. Wolfe
Attorney, Agent, or Firm—Caesar, Rivise, Bernstein, Cohen & Pokotilow, Ltd

[57] ABSTRACT

A non-return valve for a pre-combustion chamber of a gas-fueled internal combustion engine. The valve includes a body having an inlet passage and an outlet passage in fluid communication with each other via an intermediate passage of reduced diameter. An annular valve seat is provided on the outlet side of the intermediate passage upon which the ball rests when the valve is in a first or closed position. The valve ball is arranged to move to a second position to open the valve to the flow of fluid through the valve. The outlet passage includes a cover member having plural apertures to allow the flow of gas through the outlet passage. The cover member serves to retain the valve ball within the outlet passage and of quenching the back flow of high temperature gases into the outlet passage. The internal diameter of the intermediate passage is selected to result in a predetermined flow rate through the valve to achieve the desired gas-to-air ratio in the pre-combustion chamber.

10 Claims, 2 Drawing Sheets

NON-RETURN VALVE

FIELD OF THE INVENTION

The present invention relates to a non-return valve for controlling the flow of fluid in one direction only and relates particularly, though not exclusively, to a non-return valve used in a pre-combustion chamber of a gas fuelled internal combustion engine.

Throughout the specification the term "fluid" is used in the technical sense of any flowable substance, including a liquid or a gas, even though the description of the preferred embodiment is given primarily with reference to gas flow.

BACKGROUND TO THE INVENTION

In co-pending International patent application number PCT/AU92/00575 a Gas Delivery System is disclosed for delivering gaseous fuel to a spark-ignited internal combustion engine. Gaseous fuel is delivered to a region adjacent to a source of ignition, the region comprising a pre-combustion zone and a combustion zone in fluid communication with each other. Combustion of the gaseous fuel is initiated in the pre-combustion zone and the resultant effects of gaseous fuel ignition are directed to achieve combustion of the remaining gaseous fuel in the combustion zone. The relative proportions of gaseous fuel delivered to the pre-combustion zone and combustion zone respectively is carefully controlled to achieve a minimum fuel/air ratio or lean burn regime.

The non-return valve of the present invention was developed for controlling the delivery of gas to the pre-combustion zone however, as noted above, it may have application elsewhere for controlling the flow of a fluid in one direction.

SUMMARY OF THE INVENTION

According to the present invention there is provided a non-return valve for controlling the flow of a fluid in one direction through the valve and for preventing the flow of the fluid in the opposite direction, the valve comprising:

a body having an inlet passage and an outlet passage, said inlet passage and outlet passage being in fluid communication with each other via an intermediate passage of reduced diameter, a valve seat being provided on the outlet side of said intermediate passage;

a valve member movable between a first position in which it sits against said valve seat and closes the outlet passage and a second position in which it is spaced from said valve seat and the outlet passage is open to allow the flow of said fluid through the valve, and wherein said valve member is adapted to move to said first position when a back pressure of fluid in the outlet passage exceeds the pressure of said fluid in the inlet passage; and, wherein a cross-sectional area of said intermediate passage is selected to obtain a predetermined flow rate of fluid through the valve, and wherein a flow area between the valve member and the valve seat when the valve member is in the second position is substantially equal to said cross-sectional area of the intermediate passage.

Preferably said inlet passage and outlet passage are joined by a necked portion forming said intermediate passage of reduced diameter, said valve seat being provided on the outlet side of said necked portion. In the preferred embodiment the valve member is a spherical member manufactured from ceramic material. Typically said valve member is housed within the outlet passage.

Preferably said outlet passage is provided with a removable cover member having one or more apertures provided therein to allow the flow of said fluid through the outlet passage. Advantageously said cover member has a dual function of retaining said valve member in the outlet passage and of quenching the back flow of high temperature fluids back into the outlet passage.

BRIEF DESCRIPTION OF THE DRAWINGS

In order to facilitate a more comprehensive understanding of the nature of the invention a preferred embodiment of the non-return valve will now be described in detail, by way of example only, with reference to the accompanying drawings in which.

DETAILED DESCRIPTION OF PREFERRED EMBODIMENT

Figure 1:
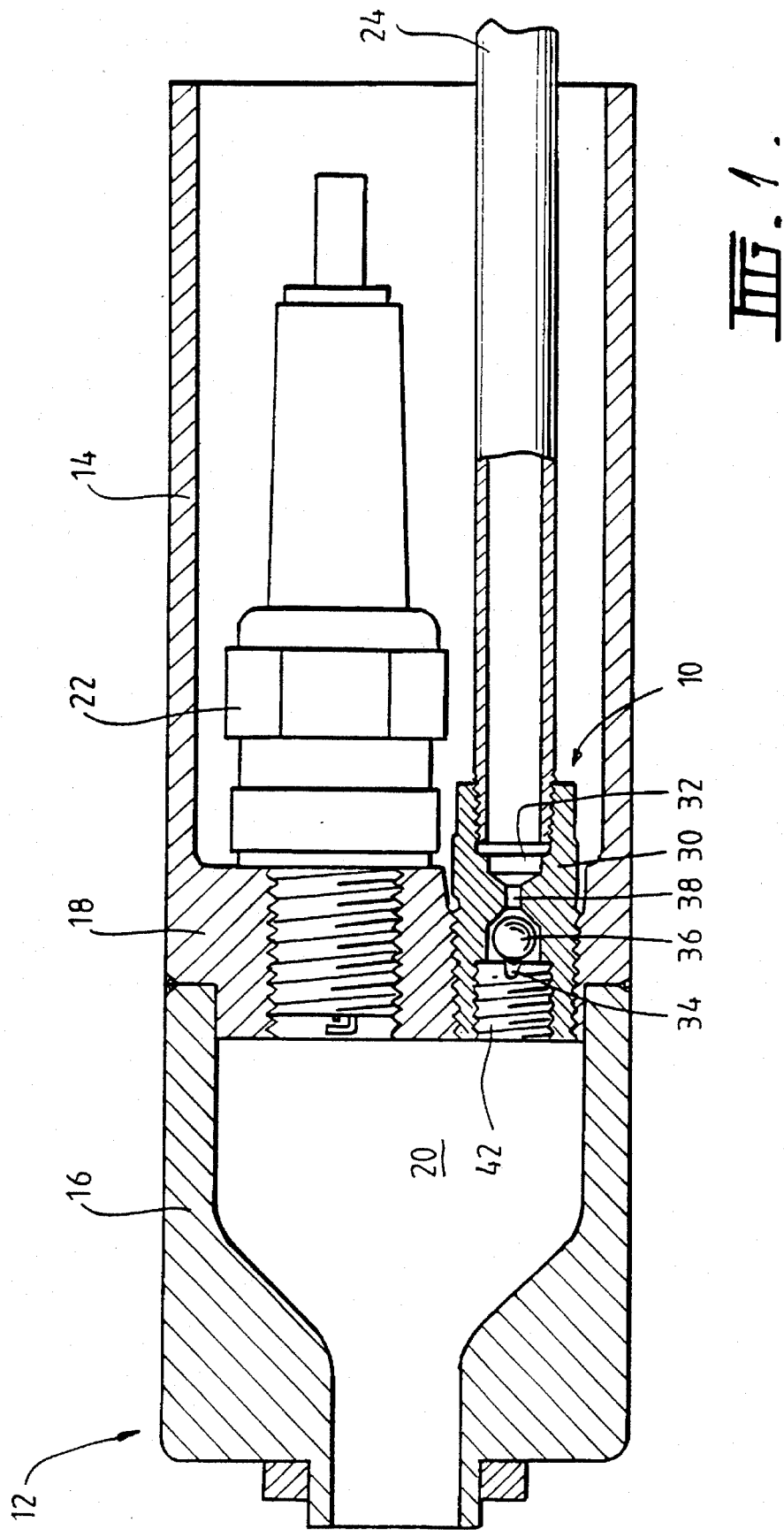
FIG. 1 is a partial section view of a pre-combustion chamber in which a preferred embodiment of a non-return valve according to the invention is employed.

In FIG. 1 a preferred embodiment of a non-return valve 10 according to the invention is illustrated, incorporated in connection with a pre-combustion chamber 12 for a gas fuelled internal combustion engine. The pre-combustion chamber 12 is of substantially cylindrical configuration and comprises an upper body portion 14 welded to a lower body portion 16, a base 18 of the upper body portion 14 defining a pre-combustion zone 20 together with the lower body portion 16. A source of ignition in the form of spark plug 22 is screwed into the base 18 of the upper body portion 14 adjacent the non-return valve 10. Gaseous fuel is delivered to the non-return valve 10 by a solenoid actuated gas injector (not illustrated) via a gas delivery line 24 from a fuel supply, typically compressed natural gas (CNG) cylinders (not illustrated).

The non-return valve 10 comprises a body 30 having an inlet passage 32, and an outlet passage 34 which is in fluid communication with the inlet passage 32. A valve member 36 is provided within the outlet passage 34 and is movable between a first position in which it closes the outlet passage, and a second position (as illustrated in FIG. 1)in which the outlet passage 34 is open to allow the flow of fluid through the valve 10.

Figure 2:
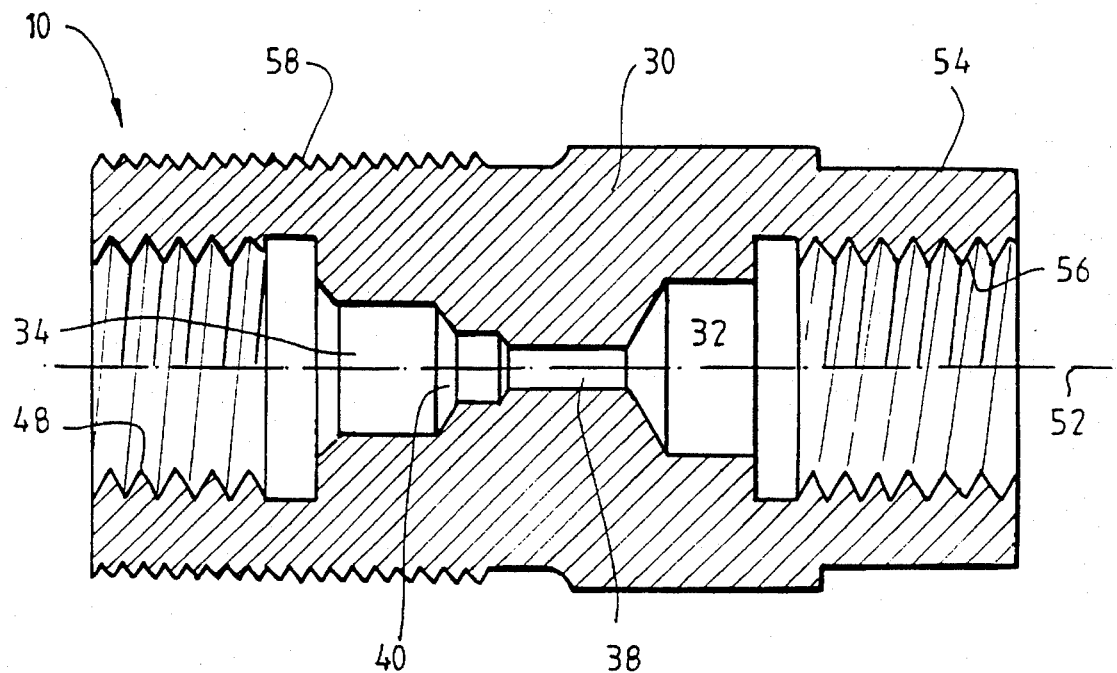
FIG. 2 is a section view of a body of the non-return valve illustrated in FIG. 1; and, FIGS. 3(a) and (b) are a side view and an end view respectively of a cover member employed in the non-return valve of FIGS. 1 and 2.

As can be seen more clearly in FIG. 2, the inlet passage 32 and outlet passage 34 are joined by a necked portion of the body 30 forming an intermediate passage 38 of reduced diameter. In this embodiment, the valve member 36 is in the form of a substantially spherical member or ball and is housed within the outlet passage 34. The necked portion of the body 30 is provided with an annular valve seat 40 on the outlet side of the intermediate passage 38, against which the valve ball 36 rests in the first position, in which it closes the outlet passage 34.

In this embodiment the internal diameter of intermediate passage 38 is 0.9 mm, and is selected to obtain a predetermined flow rate of gaseous fuel through the non-return valve 10 to achieve the desired gas to air ratio in the pre-combustion chamber 12. Most of the gas delivered from each gas injector of the engine is diverted via the inlet port of the respective engine cylinder to the combustion zone (not illustrated), whilst the remainder of the gaseous fuel passes via the gas delivery line 24 and non-return valve 10 to the pre-combustion zone 20. The relative size of the intermediate passage 38 in non-return valve 10, and the restriction offered by the gas delivery line leading to the inlet port of the cylinder, determine the proportion of gas flow each of the pre-combustion zone and the combustion zone respectively receive. Therefore, it is important in the design of the non-return valve 10 that flow areas do not restrict the designed flow rate determined by the intermediate passage 38.

Figure 3A:
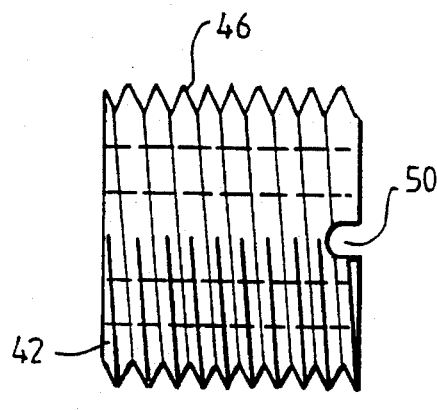
Figure 3B:
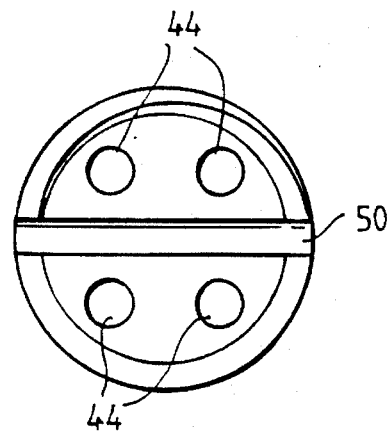

In this embodiment of the non-return valve 10 the outlet passage 34 is provided with a cover member or retainer 42 having one or more apertures 44, as illustrated in FIG. 3, to allow the flow of gas through the outlet passage 34. Cover member 42 is substantially cylindrical and has an external thread 46 which matches an internal thread 48 provided on an outlet side of the body 30. In use, cover member or retainer 42 is screwed into the body 30 and has the dual function of retaining the valve ball 36 within the outlet passage 34 and of inhibiting the back flow of unwanted fluids back into the outlet passage 34. To prevent seizure the thread of cover member 42 may be plated with copper or another appropriate material. Typically, cover member 42 is removable and for this purpose is provided with a diametrical slot 50 which enables the retainer 42 to be tightened or loosened within the body 30 using a conventional screw driver. In this way, retainer 42 can be easily removed for servicing, for example, to clean or machine the intermediate passage 38 or outlet passage 34 and/or to replace or repair the valve ball 36.

As noted above, all flow areas within the non-return valve 10 are carefully designed to maintain a predetermined flow rate through the intermediate passage 38. Thus, for example, the flow area between the ball 36 and the valve seat 40, when the ball is in the open position, is designed to equal the cross sectional area of the intermediate passage 38. As sonic flow is expected at this location the down stream absolute pressure will be 0.544 times the inlet pressure with an approximate inverse (1.84) increase in specific volume of the gaseous fuel. For this reason, the flow area of the annulus between the ball 36 and the inner circumference of the outlet passage 34 is designed to equal twice the flow area between the ball 36 and the valve seat 40. The same design philosophy is extended to the flow area through the cover member 42 which is set to four times the flow area between the ball 36 and valve seat 40. This is achieved by drilling 4×0.9 mm holes 44 through the cover member 42.

When combustion is initiated, hot gases are forced into the non-return valve 10 from the pre-combustion zone 20. To protect the valve ball 36 and valve seat 40 from excessive temperatures, the 4×0.9 holes in the cover member 42 are designed to quench the gases, due to their collective high surface area to flow area. The same gases also force the ball 36 hard against the valve seat 40 to close the outlet passage and prevent these gases from returning through the intermediate passage 38 into gas delivery line 24.

The relative dimensions and configuration of the outlet passage 34 and valve ball 36 are also designed to ensure that the valve ball 36 is forced back against valve seat 40 in sealing relationship when the combustion gases are forced back through the holes 44 in the retainer 42. If these dimensions are not correctly designed then the gases could flow around the valve ball 36 without actually displacing it towards the valve seat 40 in sealing relationship.

Preferably, the valve ball 36 is manufactured from a hardened material, to prolong the life of the valve, since the ball 36 is subjected to repeated impact with the valve seat 40 and cover 42. Likewise, valve seat 40 is preferably manufactured of hardened material, for example, by surface hardening of the steel from which the body 30 of the valve is manufactured. Alternatively, the valve seat may itself be of hardened material and replaceable. It may be undesirable to harden the entire valve body 30 as it then becomes too brittle and easily broken during removal of the valve 10 from the pre-combustion chamber 12, for servicing. Preferably the valve ball 36 is manufactured from a different material to that of valve seat 40, for example a ceramic material, to prevent corrosion and/or local welding between the ball 36 and the valve seat 40. In the illustrated embodiment, the valve seat 40 is in the form of a frusto-conical surface having an angle of inclination of 59° relative to the central axis 52 of the valve body 30.

The valve body 30 is of substantially cylindrical shape and is provided with a hexagonal head configuration 54 on the external surface at the inlet end, to enable the valve to be tightened or loosened with a conventional socket wrench. At the inlet end, body 30 is also provided with a close tolerance, parallel internal thread 56 for connecting a gas delivery tube to the non-return valve using a suitable sealant.

At the outlet side, valve body 30 is provided with a tapered, external thread 58 adapted to screw into a matching thread provided in the base 18 of the upper body portion 14 of the pre-combustion chamber 12. By using a tapered thread (⅛ inch BSPT) on the body 30 of the non-return valve, good sealing and heat transfer is effected between the body 30 and the pre-combustion chamber 12. To prevent seizure the thread 58 of body 30 may be plated with copper or another appropriate material. Furthermore, the bending action at the outer extremity of the tapered thread 58 provides a locking (radially inwards) force which clamps the cover member 42 within the body 30 and prevents it from working loose in use.

Now that a preferred embodiment of the non-return valve 10 has been described in detail, it will be obvious to persons skilled in the mechanical arts that numerous variations and modifications may be made to the described embodiment without departing from the basic inventive concepts. For example, the valve member 36 need not be in the form of a ball, but may be of, for example, cylindrical shape with the valve seat being appropriately modified. Furthermore, the relative diameters of the inlet, intermediate and outlet passages may vary considerably from that illustrated, where the flow rate of fluid through the valve is less critical. Alternative means for retaining the valve member 36 within the outlet passage may also be devised, the cover member of the preferred embodiment being particularly advantageous in view of its dual function. All such variations and modifications are to be considered within the scope of the present invention, the nature of which is to be determined from the foregoing description and the appended claims.

I claim:

1. A non-return valve for controlling the flow of fluid in one direction through the valve and for preventing the flow of the fluid in the opposite direction, said valve comprising:

a body having an inlet passage and an outlet passage, said inlet passage and outlet passage being in fluid communication with each other via an intermediate passage of reduced diameter, a valve seat being provided on the outlet side of said intermediate passage; and a valve member movable between a first position in which it sits against said valve seat and closes the outlet passage and a second position in which it is spaced from said valve seat to form a flow area therebetween and wherein said outlet passage is open to allow the flow of said fluid through the valve, said intermediate passage being at least substantially equal in cross-sectional area when said valve member is in the second position, member when said valve member is in the second position, said valve member being adapted to move to the first position when a back pressure of fluid in said outlet passage exceeds the pressure of said fluid in said inlet passage.

2. A non-return valve as claimed in claim 1, wherein said flow area between the valve member and the valve seat when the valve member is in the second position is substantially equal to said cross-sectional area of said intermediate passage.

3. A non-return valve as claimed in claim 2, wherein a flow area between the valve ball and an inner surface of the outlet passage is substantially twice the flow area between the valve ball and the valve seat whereby, in use, sonic flow of the fluid in this region can be accommodated to maintain the flow rate of fluid through the valve at substantially said predetermined flow rate.

4. A non-return valve as claimed in claim 1, wherein said outlet passage is provided with a cover member having a plurality of apertures provided therein to allow the flow of said fluid through the outlet passage when the valve member is in the second position.

5. A non-return valve as claimed in claim 4, wherein said apertures in the cover member have a collective high surface area relative to flow area whereby, in use, the cover member has a dual function of retaining said valve member in the outlet passage and of quenching the back flow of high temperature fluids back into the outlet passage.

6. A non-return valve as claimed in claim 5, wherein said cover member is substantially cylindrical and is provided with an external thread that matches an internal thread provided on the outlet side of the body whereby, in use, the cover member can be removed for maintenance purposes.

7. A non-return valve as claimed in claim 1, for controlling the flow of gaseous fuel into a pre-combustion chamber for a gas-fuelled internal combustion engine, the body of the valve being provided at the outlet side with a tapered, external thread adapted to screw into a matching thread provided in the pre-combustion chamber whereby, in use, good sealing and heat transfer is effected between the body and the pre-combustion chamber.

8. A pre-combustion chamber for a gas-fuelled internal combustion engine, incorporating a non-return valve as claimed in any one of the preceding claims for controlling the supply of gaseous fuel to the pre-combustion chamber.

9. A non-return valve for controlling the flow of a fluid in one direction through said valve and for preventing the flow of fluid in the opposite direction, said valve comprising:

a body having an inlet passage and an outlet passage, said inlet passage and outlet passage being in fluid communication with each other via an intermediate passage of reduced diameter, a valve seat provided on the outlet side of said intermediate passage;

a valve member moveable between a first position in which its sits against said valve seat and closes said outlet passage, and a second position in which it is spaced from said valve seat and said outlet passage is opened to allow the flow of said fluid through said valve, and wherein said valve member is adapted to move to the first position when a back pressure of fluid in said outlet passage exceeds the pressure of said fluid in said inlet passage;

said outlet passage being provided with a cover member having a plurality of apertures therein to allow the flow of said fluid through said outlet passage when said valve member is in the second position, said apertures having a collective high surface area relative to flow area, whereby, in use, said cover member has a dual function of retaining said valve member in said outlet passage and of quenching the back flow of high temperature fluids back into said outlet passage.

10. A non-return valve as claimed in claim 9, wherein said cover member is substantially cylindrical and is provided with an external thread that matches an internal thread provided on the outlet side of said body whereby, in use, said cover member can be removed for maintenance purposes.

* * * * *

UNITED STATES PATENT AND TRADEMARK OFFICE
CERTIFICATE OF CORRECTION

PATENT NO. : 5,609,130
DATED : March 11, 1997
INVENTOR(S) : Barry R. Neumann

It is certified that error appears in the above-indentified patent and that said Letters Patent is hereby corrected as shown below:

Please rewrite Claims 1, 2 and 6 as follows:

1. A non-return valve for controlling the flow of a fluid in one direction through the valve and for preventing the flow of the fluid in the opposite direction, the valve comprising:

a body having an inlet passage and an outlet passage, said inlet passage and outlet passage being in fluid communication with each other via an intermediate passage of reduced diameter, a valve seat being provided on the outlet side of said intermediate passage;

a valve member movable between a first position in which it sits against said valve seat and closes the outlet passage and a second position in which it is spaced from said valve seat and the outlet passage is open to allow the flow of said fluid through the valve, and wherein said valve member is adapted to move to said first position when a back pressure of fluid in the outlet passage exceeds the pressure of said fluid in the inlet passage; and wherein a cross-sectional area of said intermediate passage is selected to obtain a predetermined flow rate of fluid through the valve, and wherein a flow area between the valve member and the valve seat when the valve member is in the second position is substantially equal to said cross-sectional area of the intermediate passage.

2. A non-return valve as claimed in claim 1, wherein said outlet passage is of substantially cylindrical shape and said valve member is a substantially spherical valve ball housed within the outlet passage.

6. A non-return valve for controlling the flow of fluid in one direction through the valve and for preventing the flow of

UNITED STATES PATENT AND TRADEMARK OFFICE
CERTIFICATE OF CORRECTION

PATENT NO. : 5,609,130

DATED : March 11, 1997

INVENTOR(S) : Barry R. Neumann

Page 2 of 3

It is certified that error appears in the above-indentified patent and that said Letters Patent is hereby corrected as shown below:

the fluid in the opposite direction, the valve comprising:

a body having an inlet passage and an outlet passage, said inlet passage and outlet passage being in fluid communication with each other via an intermediate passage of reduced diameter, a valve seat being provided on the outlet side of said intermediate passage;

a valve member movable between a first position in which it sits against said valve seat and closes the outlet passage and a second position in which it is spaced from said valve seat and the outlet passage is open to allow the flow of said fluid through the valve, wherein said valve member is adapted to move to said first position when a back pressure of fluid in the outlet passage exceeds the pressure of said fluid in the inlet passage, wherein a cross-sectional area of said intermediate passage is selected to obtain a predetermined flow rate of fluid through the valve, and wherein a flow area between the valve member and the valve seat when the valve member is in the second position is substantially equal to said cross sectional area of the intermediate passage; and

UNITED STATES PATENT AND TRADEMARK OFFICE
CERTIFICATE OF CORRECTION

PATENT NO. : 5,609,130
DATED : March 11, 1997
INVENTOR(S) : Barry R. Neumann

It is certified that error appears in the above-indentified patent and that said Letters Patent is hereby corrected as shown below:

a cover member being provided with said outlet passage, said cover member having a plurality of apertures provided therein to allow the flow of said fluid through the outlet passage when the valve member is in the second position, said apertures having a collective high surface area relative to flow area whereby, in use, the cover member has a dual function of retaining said valve member in the outlet passage and of quenching the back flow of high temperature fluids back into the outlet passage, and wherein said cover member is substantially cylindrical and is provided with an external thread that matches an internal thread provided on the outlet side of the body whereby, in use, the cover member can be removed for maintenance purposes.

Signed and Sealed this

Fifteenth Day of July, 1997

Attest:

BRUCE LEHMAN

*Attesting Officer*     *Commissioner of Patents and Trademarks*